US007052654B2

(12) United States Patent
McDougald et al.

(10) Patent No.: US 7,052,654 B2
(45) Date of Patent: *May 30, 2006

(54) MULTIPHASE MIXING DEVICE WITH STAGED GAS INTRODUCTION

(75) Inventors: Neil K. McDougald, Tracy, CA (US); Sherri L. Boyd, Robbinsville, NJ (US); Gregory P. Muldowney, Glen Mills, PA (US)

(73) Assignee: ExxonMobile Research and Engineering Company, Annandale, NJ (US)

( * ) Notice: Subject to any disclaimer, the term of this patent is extended or adjusted under 35 U.S.C. 154(b) by 463 days.

This patent is subject to a terminal disclaimer.

(21) Appl. No.: 10/358,760

(22) Filed: Feb. 5, 2003

(65) Prior Publication Data

US 2004/0151643 A1 Aug. 5, 2004

(51) Int. Cl.
*B01J 10/00* (2006.01)
*B01J 8/02* (2006.01)

(52) U.S. Cl. .................. 422/191; 422/194; 422/195; 422/220; 422/224

(58) Field of Classification Search ................ 422/191, 422/194, 195, 220, 224; 261/179
See application file for complete search history.

(56) References Cited

U.S. PATENT DOCUMENTS

| 3,787,189 | A | | 1/1974 | Muffat et al. |
| 4,836,989 | A | * | 6/1989 | Aly et al. ................ 422/195 |
| 4,960,571 | A | | 10/1990 | Bhagat et al. |
| 5,152,967 | A | * | 10/1992 | Rossetti et al. ........... 422/194 |

(Continued)

FOREIGN PATENT DOCUMENTS

EP 0 462 753 A1 12/1991

(Continued)

OTHER PUBLICATIONS

Co-pending application entitled, "Improved Multiphase Mixing Device with Baffles."

*Primary Examiner*—N. Bhat
(74) *Attorney, Agent, or Firm*—Glenn T. Barrett (57) ABSTRACT

The present invention comprises a mixing system that provides improved mixing of quench gas and process fluids in a height constrained interbed space while not increasing pressure drop. In particular, the device improves the effectiveness of an existing mixing volume in mixing the gas phase of two-phase systems. The mixing system includes a horizontal collection tray, a mixing chamber positioned below the collection tray, at least one passageway extending through the collection tray into the mixing chamber, and a vapor slipstream passageway extending through the collection tray into the mixing chamber for directing a vapor slipstream from above the collection tray into the mixing chamber. The mixing chamber and the collection tray define a two-phase mixing volume. The passageway conducts fluid containing at least some vapor from above the collection tray into the mixing chamber. The mixing chamber preferably includes at least one outlet opening for the downward passage of fluid. The vapor slipstream passageway, optionally, comprises a plurality of inlets arranged to impart rotational movement to the vapor phase at a location within the mixing chamber where the vapor phase has substantially expended the kinetic energy of its initial entry into the mixing chamber. As a result of providing at least one additional passageway for a vapor slipstream, and optionally, including one or more baffles as described above, significant re-acceleration of the vapor phase is achieved in the mixing chamber resulting in improvements in mixing efficiency of both the vapor and liquid phases.

17 Claims, 4 Drawing Sheets

U.S. PATENT DOCUMENTS

| | | | |
|---|---|---|---|
| 5,403,560 A * | 4/1995 | Deshpande et al. | 422/190 |
| 5,462,719 A * | 10/1995 | Pedersen et al. | 422/195 |
| 5,554,346 A * | 9/1996 | Perry et al. | 422/195 |
| 5,567,396 A * | 10/1996 | Perry et al. | 422/190 |
| 5,635,145 A * | 6/1997 | Den Hartog et al. | 422/191 |
| 5,690,896 A * | 11/1997 | Stangeland et al. | 422/191 |
| 5,837,208 A | 11/1998 | Grott et al. | |
| 5,935,413 A * | 8/1999 | Boyd et al. | 208/49 |
| 6,180,068 B1 * | 1/2001 | Boyd et al. | 422/195 |
| 6,186,658 B1 | 2/2001 | Nishida et al. | |
| 2002/0172632 A1 * | 11/2002 | Chou | 422/220 |
| 2004/0037759 A1 | 2/2004 | VanVIlet et al. | |

FOREIGN PATENT DOCUMENTS

| | | |
|---|---|---|
| EP | 0 472 335 A1 | 2/1992 |
| EP | 0 663 236 A1 | 7/1995 |
| EP | 0 716 881 A1 | 6/1996 |

* cited by examiner

MULTIPHASE MIXING DEVICE WITH STAGED GAS INTRODUCTION

FIELD OF THE INVENTION

The present invention relates generally to systems for mixing process gases and liquids and more specifically to interbed quench and mixing systems involving cocurrent downflow reactors using fixed hardware.

BACKGROUND OF THE INVENTION

Downward flow reactors are used by the chemical and refining industries in a variety of processes, such as hydrotreating, hydrofinishing and hydrocracking. A typical downward flow reactor has a cylindrical outer wall with a catalyst bed positioned within the reactor. The catalyst bed generally rests on a catalyst support grid positioned horizontally within the reactor and spanning the complete diameter of the reactor. The catalyst support grid, together with the outer wall, cooperates to retain the catalyst or other particulate material in place. A distribution tray is positioned horizontally within the reactor at a location above the catalyst bed for evenly distributing process fluids onto the catalyst. The catalyst support grid, outer reactor wall and the distribution tray define the volume of the catalyst bed.

Multiple bed reactors are commonly used. They are formed by providing two or more such catalyst beds spaced along the longitudinal axis of the reactor. The region between successive catalyst beds defines an interbed mixing zone. When a reactor having more than one catalyst bed is used, reactant fluids are introduced into the reactor above the uppermost catalyst bed. The reactant fluids, which typically consist of both liquid and vapor phases, flow through the uppermost catalyst bed.

From the uppermost catalyst bed, unreacted reactant fluids and the related fluid products derived from interaction with the catalyst enter the interbed mixing zone. The interbed mixing zone typically includes a mixing chamber. This interbed mixing zone including a mixing chamber serves several purposes. First, the interbed mixing zone serves as a convenient place through which additional reactants and/or temperature-quenching materials can be introduced into the fluid products. In the reactor units described above, gas and liquid flow downward through multiple beds of solid catalyst. Because of this flow and the contact between the reactants and the catalyst(s), heat is released causing temperature to increase with distance down the bed. In many cases, cool hydrogen-rich gas is introduced between the beds to quench the temperature rise and replenish the hydrogen consumed by the reactions. Secondly, the interbed mixing zone provides a region for mixing the fluid products. Mixing the fluid products prior to reaction in lower catalyst beds ensures more uniform and efficient reactions. In addition, where catalytic reactions are exothermic and temperature control is a critical processing and safety element, mixing of the fluid products within the mixing chamber can be used to eliminate regions of locally high temperature within the fluid products.

The introduction and mixing of quench into the process gas and liquid must be carried out in the interbed space, which spans the full vessel diameter, but is often shorter than one vessel radius. Support beams, piping and other obstructions also occupy the interbed region so that unique hardware is required to perform efficient two-phase mixing in what amounts to limited volume.

Poor quench zone performance manifests itself in two ways. First, the quench zone fails to erase lateral temperature differences at the outlet of the preceding bed or, in the worst cases, amplifies them. An effective quench zone should be able to accept process fluids with 50 to 75 degree F. lateral temperature differences or higher and homogenize them sufficiently that differences do not exceed 5 degree F. at the following bed inlet. The second sign of poor performance is that inlet temperature differences following the quench zone increase as the rate of quench gas is raised. This indicates inadequate mixing of cooler gas with the hot process fluids.

Poor quench zone performance limits reactor operation in various ways. When interbed mixing is unable to erase temperature differences, these persist or grow as the process fluids move down the reactor. Hot spots in any bed lead to rapid deactivation of the catalyst in that region which shortens the total reactor cycle length. Product selectivities are typically poorer at higher temperatures; hot regions can cause color, viscosity and other qualities to be off-specification. Also, if the temperature at any point exceeds a certain value (typically 800 to 850 degree F.), the exothermic reactions may become self-accelerating leading to a runaway which can damage the catalyst, the vessel, or downstream equipment. Cognizant of these hazards, refiners operating with poor internal hardware must sacrifice yield or throughput to avoid these temperature limitations. With present day refinery economics dictating that hydroprocessing units operate at feed rates far exceeding design, optimum quench zone design is a valuable low-cost debottleneck.

A variety of multiple bed reactors and related mixing chambers have been previously described. For example, some mixing chambers are designed to impart rotational, radial, and/or turbulent flow to the fluids in the chamber. In others, a tortuous path is provided for improved mixing. Still other arrangements are designed to provide separate mixing of the vapor and the liquid phases of the fluids. An arrangement wherein two completely separate mixing chambers for imparting rotational flow individually to each phase prior to inter-phase mixing has also been described.

As stated above, the configuration of the mixing chamber must be designed to fit within the fixed volume of the interbed mixing zone while not substantially adversely affecting pressure drop within the reactor. Low pressure drops across the mixing zone are desirable to permit higher fluid flow rates within the reactor. The fixed volume of the interbed mixing zone is a result of design factors including the number of stages of catalyst required to achieve particular reaction characteristics and the desired flow rate through the reactor.

U.S. Pat. No. 4,836,989 describes a method for quench zone design. The essential feature of this design is the rotational flow created in the mixing volume, which increases fluid residence time and provides repeated contacting of liquid and gas from different sides of the reactor. This design is keyed to liquid mixing. More recent studies have shown it to be only a fair gas mixer. The trend to higher conversion and higher hydrogen circulation in fuels refining translates to gas/liquid ratios for which this design is not well suited. Height constrained units cannot be fitted with mixing chambers of the type described in this patent to the point that they are deep enough to effectively mix both the gas and liquid phases.

The interbed mixing system described in U.S. Pat. No. 5,462,719 offers some improvements over the design described above when gas mixing is paramount. This hardware is based again on a swirl chamber, but also includes at least three highly restrictive flow elements to enhance mixing, which such elements necessarily increase pressure drop. Like the previously described system, this quench zone mixes the gas and liquid at once in a single chamber.

Another system, which is disclosed in U.S. Pat. No. 6,180,068, referenced above, also provides enhanced mixing of quench gas and process fluids within the interbed space. This system employs separate mixing zones for each of two reactants permitting flexibility in mixing conditions while minimizing pressure drop as well as space and volume requirements. However, the efficiency of this device is sensitive to the degree of phase segregation achieved at the interbed inlet and thus may not perform as desired under all conditions and with respect to particular reactant characteristics.

The above and other known mixing systems generally suffer from the fact that there is insufficient space within the mixing chamber to promote intense two-phase mixing. Accordingly, there is a continued need to provide mixing systems that provide intense two-phase mixing. A preferred system also should provide sufficient volume for the vapor phase to mix separately from the liquid phase. Even while satisfying the above criteria, it is preferable that the designated mixing system minimizes the pressure drop within the reactor as well as permitting relatively easy retrofit with existing reactor systems.

A co-pending patent application filed by the assignee of the present invention describes the use of baffles in connection with the mixing system and the resulting process. According to the teachings of that invention and as further described in that patent application, at least one baffle comprising a substantially vertical continuous perimeter solid extrusion is attached to the underside of the collection tray. In a preferred embodiment of that invention, the diameter of the baffle is greater than the diameter of the mixing chamber outlet rim and smaller than the diameter defined by the spillway outlets. While that invention provides significant improvement in terms of mixing performance, it has been found that additional benefits and synergistic results can be obtained through the use of other and additional structural elements within the mixing system as described herein.

As can generally be surmised from the above discussion, among other things, there is a deficiency in the prior art with respect to the mixing of the gas phase. Prior art interbed mix zone designs typically feature a common inlet to the mixing chamber for both gas and liquid. This gives the beneficial result that the liquid is propelled into the mixing chamber at a high velocity determined by both the gas and liquid flow rates. This inlet velocity typically imparts enough kinetic energy to the liquid to guarantee significant rotation in the mixing chamber. By contrast, the gas, being of lower density, dissipates the entering kinetic energy and departs from the desired rotational motion more quickly. As a result, gas phase mixing in prior art systems has been less than ideal.

SUMMARY OF THE INVENTION

The present invention provides a novel means to provide more effective mixing of quench gas and process fluids in a height constrained interbed space while not increasing pressure drop. In particular, the device improves the effectiveness of an existing mixing volume in mixing the gas phase of two-phase systems.

According to the teachings of the present invention, a mixing system is described with such mixing system comprising a horizontal collection tray, a mixing chamber positioned below the collection tray, at least one passageway extending through the collection tray into the mixing chamber, and a vapor slipstream passageway extending through the collection tray into the mixing chamber for directing a vapor slipstream from above the collection tray into the mixing chamber. The mixing chamber and the collection tray define a two-phase mixing volume. The passageway conducts fluid containing at least some vapor from above the collection tray into the mixing chamber. The mixing chamber preferably includes at least one outlet opening for the downward passage of fluid. The vapor slipstream passageway, optionally, comprises a plurality of inlets arranged to impart rotational movement to the fluids within the mixing chamber. In one embodiment, the plurality of inlets comprises open-ended tubes with outlets arranged tangentially with respect to the rotational axis of the fluids in the mixing chamber. The introduction of one or more baffles as described in applicant's co-pending application entitled "Improved Multiphase Mixing Device with Baffles" (Attorney Docket Number 10689) may optionally be implemented in accordance with the mixing system described herein so as to obtain the benefits described in that patent application.

As a result of providing at least one additional passageway for a vapor slipstream, and optionally, including one or more baffles as described above, significant improvements in mixing efficiency are obtained. Among the resulting benefits is the fact that the additional flow paths provided offer an additional location where gas energy may be sourced so as to provide the most effective mixing of the gas phase. According to the teachings of the present invention a second injection of gas into the mixing chamber is provided in order to renew the rotational motion begun upon initial entry to the chamber, and to provide a dedicated volume within the mixing chamber where this gas-phase re-acceleration can take place. The invention may be extended to arbitrarily many subsequent injections of gas slipstreams to achieve repeated renewal of the rotational motion, subject only to spatial and fabrication limits on the interbed assembly. Additional features and embodiments of the present invention will become apparent to those skilled in the art in view of the following disclosure and appended claims.

DETAILED DESCRIPTION OF THE INVENTION

Figure 1:
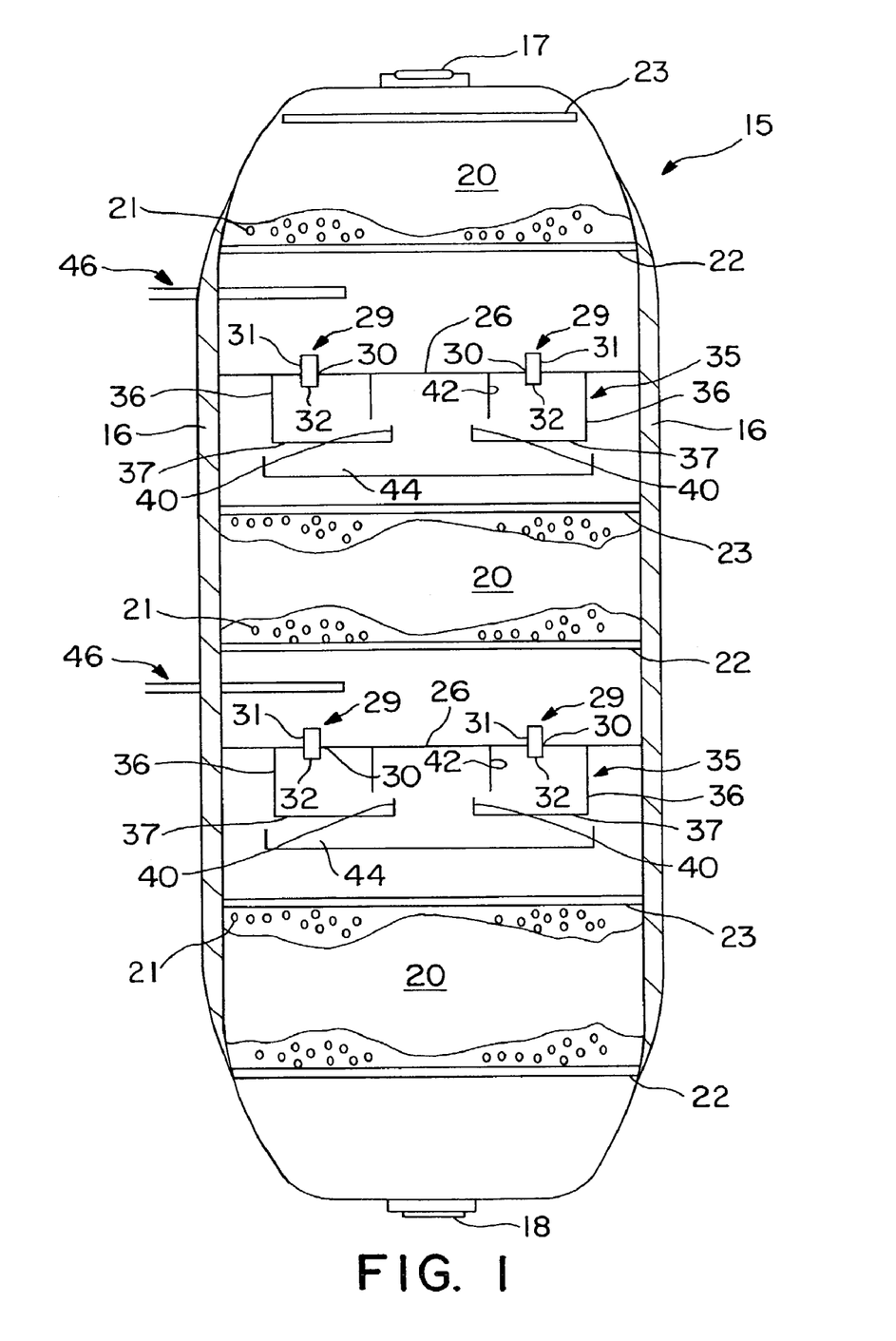
FIG. 1 is a schematic, side-elevational view of a reactor column, shown in cross section.
Figure 2:
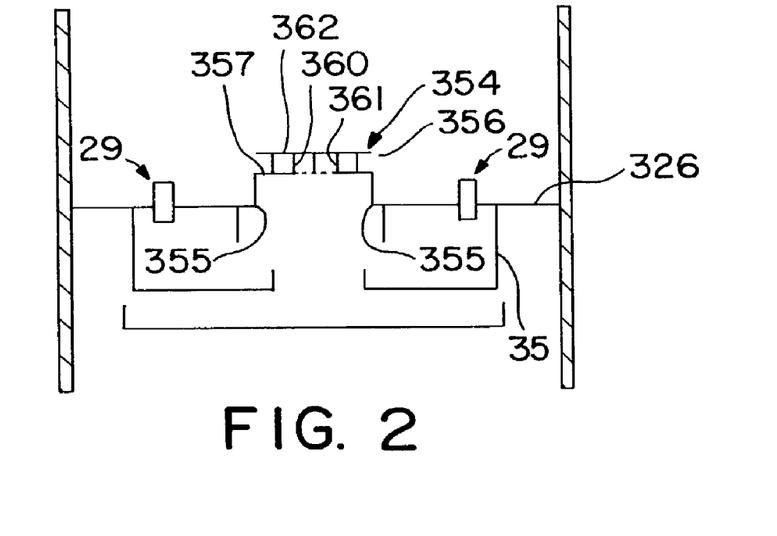
FIG. 2 is a schematic, side-elevational view of the mixing system of the present invention according to a first embodiment thereof.
Figure 3:
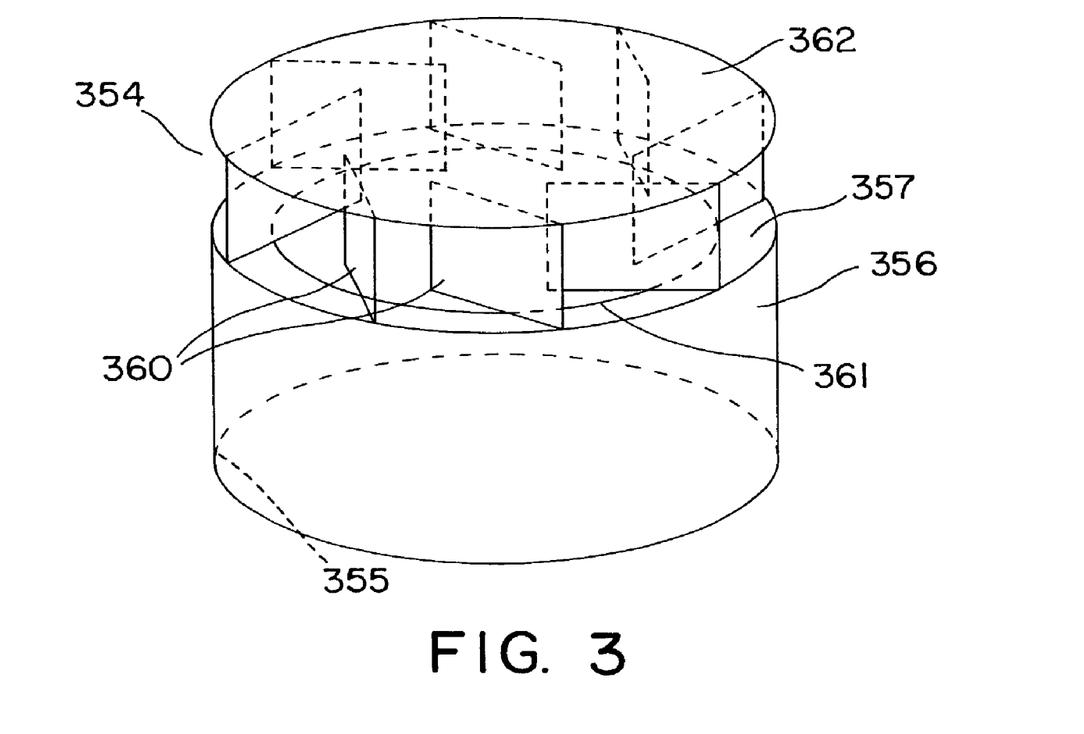
FIG. 3 is a schematic, oblique view of the mixing system of the present invention according to a first embodiment thereof.

FIG. 1 shows, in simplified form, a hydroprocessing reactor column in accordance with the present invention. FIG. 1, FIG. 2, and FIG. 3 taken together, illustrate the present invention according to a first embodiment thereof. The general configuration of the reactor is conventional, as are details such as the supports for the grids and distributor plates, which are not shown for purposes of clarity. The reactor column 15 is formed as a generally cylindrical chamber having an outer wall 16. A reactor inlet 17 and a reactor outlet 18 are provided for introducing and discharging fluids from the reactor column 15. The reactor column 15 further comprises one or more catalyst beds 20 positioned along the longitudinal axis of the reactor column 15. Each of the catalyst beds 20 contains catalyst material 21, which is preferably supported below by a catalyst support grid 22. The catalyst support grid 22, together with the outer wall 16, provides direct support for the catalyst material 21. Alternatively, the catalyst support grid 22 may provide indirect support for the catalyst 21 by retaining one or more layers of a larger supporting solid or solids, which in turn support the catalyst 21. A distribution tray 23, for facilitating even distribution of fluids over the catalyst 21, is preferably provided above the catalyst material 21. The catalyst support grids 22 and the distribution trays 23 comprise meshed or perforated portions having openings sufficiently large to allow fluids to pass therethrough. In addition, the openings in the catalyst support grids 22 are sufficiently small so as to prevent the catalyst 21 from passing through. Further, it will be appreciated that the openings in the distribution trays 23, and any flow devices, which may be associated with the openings in the distribution trays 23, should be sized and spaced such that fluids deposited onto the distribution tray 23, are generally forced to spread substantially over the distribution tray 23 before passing through distribution tray 23.

The spaces between successive catalyst beds define interbed mixing zones. The interbed mixing zones function, in part, to provide a homogeneous mixture of reactants to the catalyst beds 20. Additionally, the interbed mixing zones provide a convenient position for introducing quench fluids and/or supplemental reactants into reactor column 15. Although the embodiment shown in FIG. 1 contains three catalyst beds 20 and two interbed mixing zones, it will be appreciated by those skilled in the art that the reactor in accordance with the present invention may contain more or less than three catalyst beds and more or less than two interbed mixing zones.

A mixing system is positioned within at least one of the interbed mixing zones. The mixing system comprises a collection tray 26, which extends generally perpendicular to a longitudinal axis of reactor column 15. Collection tray 26 spans substantially across the entire diameter of reactor column 15 so as to divide the interbed mixing zone into an upper and a lower region. Accordingly, collection tray 26 collects fluids passing through the catalyst bed 20, which is positioned above collection tray 26.

One or more passageways 29 are provided in collection tray 26 to provide fluid communication between the upper and lower regions of the interbed mixing zone. Accordingly, the passageways 29 permit vapor and/or liquid phases collected above the collection tray 26 to flow downwardly into the lower region of the interbed mixing zone. In the embodiment shown, each collection tray 26 comprises two passageways 29 formed as spillways. Each of the spillways is formed as an opening 30 within the collection tray 26. A first conduit 31 is formed above the opening 30 for directing fluids through opening 30 and a second conduit 32 is formed beneath opening 30 for directing fluids that have passed through opening 30 away from opening 30. It will, however, be appreciated by those of skill in the art that other designs may be utilized. For example, the passageways may comprise open-ended tubes passing through collection tray 26.

Mixing chamber 35 is positioned below collection tray 26 to receive fluids, which pass through passageways 29. In the embodiment shown in FIG. 1, the mixing chamber comprises a cylindrical wall 36 attached to, and extending generally perpendicular away from a lower surface of collection tray 26. Mixing chamber 35 further comprises floor 37, extending generally horizontally from cylindrical wall 36 upon which fluid can collect. Weir 40 is positioned generally peripherally at the end of floor 37 as a retaining wall extending perpendicularly and upwardly from floor 37 of mixing chamber 35. Fluids must therefore flow over weir 40 prior to exiting mixing chamber 35. Accordingly, weir 40 functions to retain fluid on the floor 37 of mixing chamber 35 until the level of fluid on floor 37 is about the same as, or higher than the height of weir 40.

Flash pan 44 is optionally positioned within the interbed mixing zone below mixing chamber 35. Flash pan 44 comprises a floor with a retaining wall extending substantially vertically upward about the perimeter of the floor. Flash pan 44 also optionally comprises openings or upstanding pipes to convey fluid through the floor of flash pan 44. Flash pan 44 may be provided to receive fluids as they are discharged from mixing chamber 35 so as to evenly distribute the fluids over the surface of distribution tray 23.

In addition, one or more injectors 46 optionally extend through the wall 16 of reactor column 15 into one or more of the interbed mixing zones. Injectors 46 enable a fluid or a gas to be injected into one or more of the interbed mixing zones. Injectors 46 may also enter through the top or bottom head of reactor column 15 and pass through catalyst beds 20 and distribution trays 23 to arrive at the interbed mixing zone. For example, in a hydroprocessing reactor, hydrogen may be injected as both a quench fluid and as a reactant. Injectors 46 should provide a uniform, initial distribution of the fluid or gas within the upper regions of the interbed mixing zones.

Although not required for the first embodiment of the present invention, FIG. 1 further shows a baffle 42 within mixing chamber 35. As described in applicant's co-pending U.S. patent application Ser. No. 10/341,123, filed on Jan. 13, 2003, entitled "Improved Multiphase Mixing Device with Baffles," which is hereby incorporated by reference, baffle 42 facilitates the mixing of fluids within mixing chamber 35. In FIG. 1, baffle 42 extends perpendicularly and downwardly from the bottom of collection tray 26.

Turning now specifically to FIG. 2 and FIG. 3, the specific teachings of the present invention in a first embodiment are further described. In such first embodiment, a gas swirl chamber is provided such that a fraction of the gas phase components may bypass the two-phase passageways 29. The resulting tangential inlets to the swirl chamber establish a rotation in the slipstreams of gas, which complements the rotational flow of the two-phase fluid already established in mixing chamber 35. The mixing system of the first embodiment as illustrated specifically by FIGS. 2 and 3 includes a plurality of vanes 360 which direct a portion or slipstream of the vapor phase components of the product fluid, unreacted reactant fluid, quench fluids, and/or supplemental reactants from the upper region of the interbed mixing zone to the lower region of the interbed mixing zone.

In so doing, vanes 360 provide for re-acceleration of the vapor phase within the mixing system. As best seen from FIG. 3, an opening 361 is formed in the bottom portion (landing) 357 of the upwardly projecting sub-region 354. Vanes 360 extend substantially upwardly from landing 357, which contains opening 361. Vanes 360 are preferably angled such that vanes 360 impart a rotational or "swirling" motion to the vapor phase components as the vapor phase components flow around vanes 360 and through openings 361 and 355 into the volume circumscribed by baffle 342 in the event baffle 342 is present. If baffle 342 is not present, the vapor components flow into the general area of mixing chamber 35 below opening 355. The angle formed in the horizontal plane between any one of vanes 360 and the radius of upwardly projecting sub-region 354 is preferably between 10 and 80 degrees, with an angle between 40 to 50 degrees being the most preferable embodiment. As can be seen in the figures, a cover 362 is preferably positioned above vanes 360 to reduce the flow of the liquid phase components through opening 361 and to force the gas phase flow to enter substantially horizontally through vanes 360.

Preferably, according to this embodiment, upwardly projecting sub-region 354 is formed over an opening 355 in collection tray 326 as an upwardly extending wall 356 positioned about the perimeter of opening 355. The mixing system of the present invention in its first embodiment is preferably designed such that if baffle 342 is present, wall 356 of the upwardly projecting sub-region 354 is not coextensive with baffle 342. Instead, opening 355 is wholly contained within the area circumscribed by baffle 342 on collection tray 326. The height of upwardly extending wall 356 can be varied to suit the particular application for which the mixing system is to be used.

Figure 4:
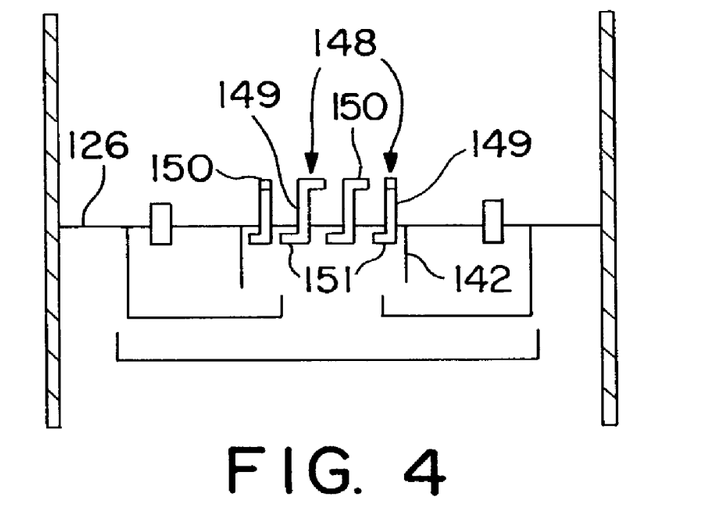
FIG. 4 is a schematic, side-elevational view of the mixing system of the present invention, shown in partial cross-section, according to a second embodiment thereof.

An alternative embodiment of the mixing system in accordance with the present invention is illustrated in FIG. 4. In the embodiment described in connection with FIG. 4, a multitude of vapor chimneys or other conduits passing through collection tray 126 provides an additional flow path for gas slipstreams. The mixing system of FIG. 4 is in many aspects identical to the mixing system described as the first embodiment herein. However, the mixing system illustrated in FIG. 4 as a second embodiment of the present invention comprises conduits or chimneys 148 extending through collection tray 126 into the volume circumscribed by baffle 142 if baffle 142 is present. If baffle 142 is not present, conduits or chimneys 148 extend through the collection tray in the volume circumscribed by passageways 29. Chimneys 148 direct a portion or slipstream of the vapor phase components of the product fluid, unreacted reactant fluid, quench fluids, and/or supplemental reactants from the upper region of the interbed mixing zone to the lower region of the interbed mixing zone. In so doing, chimneys 148 provide for re-acceleration of the vapor phase within the mixing system. Additionally, chimneys 148 provide the benefit of reducing the overall pressure drop in the reactor by increasing the number of pathways for vapor to flow. In the particular embodiment shown in FIG. 4, each of the chimneys 148 is formed from a first tubular section 149 extending through collection tray 126 and oriented such that a longitudinal axis of the first tubular section is substantially perpendicular to collection tray 126.

A generally horizontally oriented inlet 150 is formed by a second tubular section about an end of the first tubular section 149 protruding into the upper region of the interbed mixing zone. The inlet 150 is so formed to reduce, or eliminate entirely, the amount of liquid components from passing through chimney 148. A generally horizontally oriented outlet 151 is formed by a third tubular section about an end of the first tubular section 149 extending into the lower region of the interbed mixing zone. The outlets 151 of chimneys 148 are preferably oriented to impart a rotational or "swirling" motion to the vapor phase components as those components exit chimneys 148. The rotational or "swirling" motion further improves the vapor phase mixing efficiency and creates intense two-phase mixing by re-accelerating the vapor phase.

Figure 5:
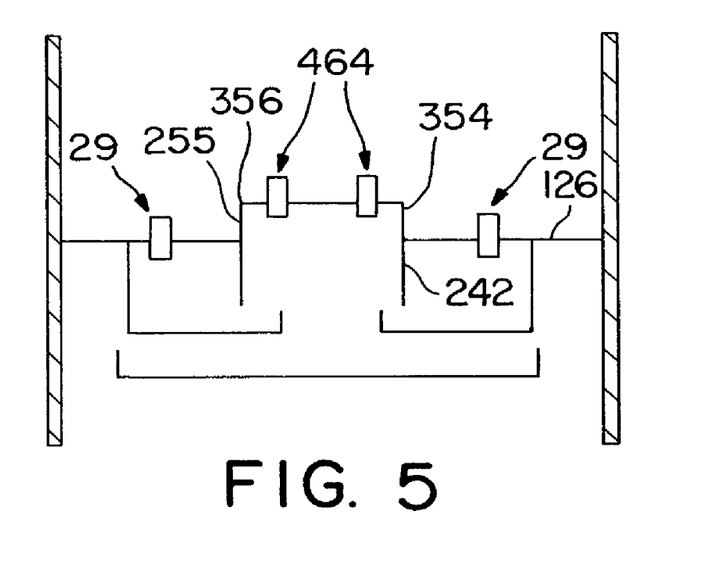
FIG. 5 is a schematic, side-elevational view of the mixing system of the present invention, shown in partial cross-section, according to a third embodiment thereof.

Turning now to FIG. 5, a third embodiment of the present invention is next discussed. In this embodiment, the mixing system comprises an upwardly projecting sub-region or raised cap 354. As shown, the upwardly projecting sub-region 354 is formed over an opening 255 in the collection tray 126 as an upwardly extending wall 356 positioned above the perimeter of opening 255 such that wall 356 is coextensive with baffle 242 if baffle is present as shown in FIG. 5. If baffle 242 is not present, any opening size within the circumference formed by the passageways 29 may be used. The height of the upwardly extending wall 356 may be varied to suit the particular application for which the mixing system is to be used.

The mixing system in the third embodiment of the present invention comprises at least one and preferably a plurality of spillways 464 which direct a portion or slipstream of the vapor phase components of the product fluid, unreacted reactant fluid, quench fluids, and/or supplemental reactants from the upper region of the interbed mixing zone to the lower region of the interbed mixing zone. In so doing, spillways 464 provide for re-acceleration of the vapor phase within the mixing system. Spillways 464 may be structurally similar to the spillways 29 described above in connection with FIG. 1. Spillways 464 are preferably oriented to impart a rotational or "swirling" motion to the vapor phase components as these components exit spillways 464. The rotational or "swirling" motion further improves the vapor phase mixing efficiency.

Figure 6:
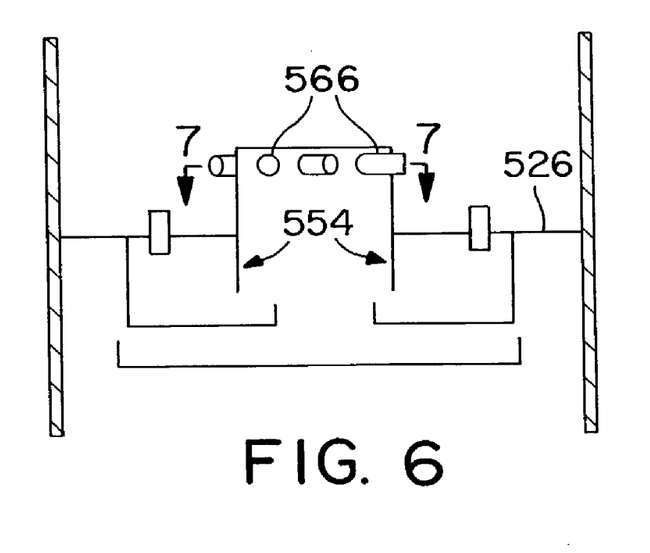
FIG. 6 is a schematic, side-elevational view of the mixing system of the present invention, shown in partial cross-section, according to a fourth embodiment thereof.
Figure 7:
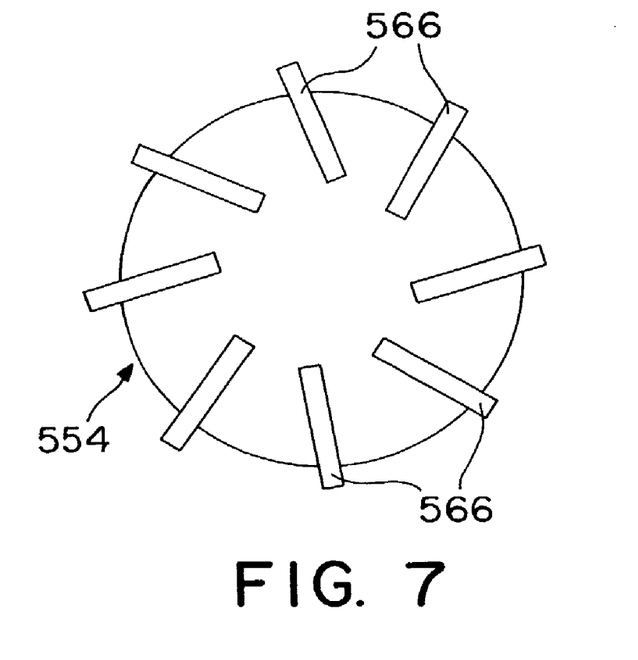
FIG. 7 is a schematic, cross-sectional view taken along the 7—7 line in FIG. 6.

In yet another embodiment of the mixing system of the present invention, which is illustrated by FIGS. 6 and 7, conduits are included such that they pass through the vertical wall of a raised cylindrical volume in the collection tray. In this fourth embodiment of the present invention, these conduits terminate in a tangential orientation to create beneficial rotational flow within the raised volume. In this embodiment, it is preferable that the cylindrical cap, which comprises upwardly projecting sub-region 554, extends even higher above collection tray 526 than the upwardly projecting sub-regions discussed in previously described embodiments.

The mixing system according to the fourth embodiment of the present invention comprises a plurality of inlets 566, which direct a portion or slipstream of the vapor phase components of the product fluid, unreacted reactant fluid, quench fluids, and/or supplemental reactants from the upper region of the interbed mixing zone to the lower region of the interbed mixing zone. In so doing, inlets 566 provide for re-acceleration of the vapor phase within the mixing system. As shown, each inlet 566 is formed from a tubular section that projects through the upwardly projecting sub-region 554. The tubular sections are preferably oriented to impart a rotational or "swirling" motion to the vapor phase components as these components exit the inlets 566. This rotational or "swirling" motion further improves the vapor phase mixing efficiency.

As referenced above with respect to each of the embodiments generally, although the FIGS. and the discussion generally show the combined use of a baffle, an upwardly projecting sub-region and alternate vapor slipstream flow paths, as will readily be recognized by one of skill in the art, each of these features can be utilized independently or in various combinations depending upon the particular application and other constraints. It should be noted that combinations of the herein described features can and do offer synergistic results. Multiple upwardly projecting sub-regions may be formed within a single collection tray to multiply the benefits of the present invention within a system so long as space allows.

The following table presents data resulting from cold flow testing reflecting pressure drop for the various embodiments of the present invention, relative to a base design without secondary flow paths for slipstreams of gas, at fixed operating conditions.

| Run | Description | ΔP Psi |
|---|---|---|
| 74 | Base Case – No Slipstreams | 4.1 |
| 80 | Base + 4 vapor chimneys | 4.0 |
| 92 | Base + 8 vapor chimneys | 3.8 |
| 87 | Base + 16 vapor chimneys | 3.3 |
| 86 | Base + Gas Swirl Chamber | 3.1 |

The following table presents data resulting from cold flow testing reflecting mixing performance for the gas swirl chamber relative to a base design without secondary flow paths for slipstreams of gas, at fixed operating conditions. The reported mixing index is defined as 100 less the standard deviation of tracer concentration, expressed as a percentage of the mean concentration, from eight sample locations equally spaced around the perimeter of the vessel below the mixing chamber. The different mixing indices reported correspond to different tracer injection locations upstream of the mixing volume. The averages shown are weighted to reflect the fraction of the reactor cross-section represented by each injection location as determined by the geometry and symmetry of the volume above the collection tray. The weights for injection locations 1 to 6 are 2, 2, 2.5, 4, 3 and 1, respectively.

| Run | Description | Sample 1 | Sample 2 | Sample 3 | Sample 4 | Sample 5 | Sample 6 | Avg |
|---|---|---|---|---|---|---|---|---|
| 74 | Base Case – No Slipstreams | 46 | 50 | 94 | 55 | 60 | 47 | 60 |
| 86 | Base + Gas Swirl Chamber | 59 | 62 | 75 | 67 | 62 | 45 | 64 |

As can be seen, the addition of gas slipstreams via chimneys reduces pressure drop and the introduction of gas via a swirl chamber reduces pressure drop while improving gas mixing.

The teachings of the present invention may be employed in any multi-bed catalytic reactor or contactor requiring intermittent mixing and/or quench of downward flowing gas and liquid phases particularly when taking advantage of rotational flow in a mixing volume. The invention is particularly beneficial in connection with units with very limited inter-bed height. Further, existing quench hardware may relatively easily be retrofitted with the improvements discussed herein to achieve the benefits described.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims, and by their equivalents.

What is claimed is:

1. A multiphase mixing system for distributing vapor and liquid across a downflow reactor, comprising:
   a collection tray for receiving vapor and liquid, wherein the collection tray includes an upwardly protecting sub-region;
   a mixing chamber below the collection tray having at least one outlet opening for the downward passage of vapor and liquid;
   at least one conduit extending through the collection tray into the mixing chamber for permitting the flow of vapor and liquid from above the collection tray and into the mixing chamber; and
   at least one vapor slipstream passageway extending through the upwardly projecting sub-region for permitting the flow of a vapor slipstream from above the collection tray and into the mixing chamber,
   wherein each of the at least one vapor slipstream passageway includes a vapor conduit, wherein the vapor conduit extends through the upwardly projecting sub-region.

2. The system of claim 1, further comprising at least one baffle wherein the at least one baffle is attached to a bottom of the collection tray and wherein the at least one baffle is located between the outlet of the mixing chamber and the at least one conduit extending through the collection tray.

3. The system of claim 1, further comprising a plurality of the vapor conduits, wherein each vapor conduit comprises an open-ended tubes passing through the upwardly projecting sub-region.

4. The system of claim 3 wherein the longitudinal axis of the open-ended tubes is substantially perpendicular to the collection tray.

5. The system of claim 4 further comprising at least one baffle wherein said at least one baffle is attached to the bottom of said collection tray and wherein said at least one baffle is located between said outlet of said mixing chamber and said conduit extending through said collection tray.

6. The system of claim 1 wherein said collection tray comprises a plurality of upwardly projecting sub-regions.

7. The system of claim 1, wherein the at least one vapor conduit passes through a vertical wall of the upwardly projecting sub-region and wherein the conduits terminate in a tangential orientation with respect to the rotational axis of the fluid in order to create beneficial rotational flow within the upwardly projecting sub-region.

8. The system of claim 7 further comprising at least one baffle wherein said at least one baffle is attached to the bottom of said collection tray and wherein said at least one baffle is located between said outlet of said mixing chamber and said conduit extending through said collection tray.

9. A downflow reactor comprising:
a horizontal collection fray for receiving a fluid containing a vapor component, wherein the collection tray includes an upwardly projecting sub-region;
a mixing chamber positioned below the collection tray;
at least one vapor component passageway extending through the collection tray into the mixing chamber for conducting the vapor component of the fluid from above the collection tray into a corresponding mixing chamber;
at least one fluid passageway, located between the vapor component passageway and a wall of the downflow reactor for conducting the fluid from above the collection tray into the mixing chamber; and
a baffle positioned below the collection trays and located between the vapor component passageway and the fluid passageway,
wherein the at least one vapor component passageway extending through the upwardly projecting sub-region, wherein each of the at least one vapor component passageway comprising a conduit extending through the upwardly projecting sub-region, wherein the conduit has a free end spaced from the upwardly projecting sub-region.

10. The downflow reactor of claim 9, wherein the baffle is formed as a downward extension of a wall forming the upwardly projecting sub-region.

11. A downflow reactor comprising:
a horizontal collection tray for receiving a fluid containing a vapor component;
a mixing chamber positioned below the horizontal collection tray;
at least one vapor component passageway extending through the collection tray into the mixing chamber for conducting the vapor component of the fluid from above the collection tray into the mixing chamber, wherein the at least one vapor component passageway includes a plurality of open-ended tubes passing through the collection tray;
at least one fluid passageway for conducting the fluid from above the collection tray into the mixing chamber; and
a baffle positioned below the collection tray, wherein the baffle being positioned between the at least one vapor component passageway and the at least one fluid passageway.

12. The downflow reactor of claim 11, wherein each longitudinal axis of the plurality of open-ended tubes is substantially perpendicular the collection tray.

13. The downflow reactor of claim 11, wherein each of the plurality of open-ended tubes further comprise an inlet tubular section above the collection tray that extends substantially parallel to the collection tray.

14. The downflow reactor of claim 11, wherein each of the plurality of open-ended tubes further comprise an outlet tubular section below the collection fray that extends substantially parallel to the collection tray.

15. The downflow reactor of claim 9, wherein the collection tray comprises a plurality of upwardly projecting sub-regions.

16. The downflow reactor of claim 9, wherein the conduit passes through a vertical wall of the upwardly projecting sub-region and wherein the conduits terminate in a tangential orientation with respect to the rotational axis of the fluid in order to create beneficial rotational flow within the upwardly projecting sub-region.

17. The downflow reactor of claim 9, wherein the conduit passes through a top wall of the upwardly projecting sub-region.

* * * * *